United States Patent [19]
Combe et al.

[11] Patent Number: 6,031,475
[45] Date of Patent: Feb. 29, 2000

[54] METHOD AND DEVICE OF INFORMATION TRANSFER BETWEEN CIRCUITS THAT EXCHANGE DATA VIA CONVERTERS

[75] Inventors: Michel Combe, Meylan; Christian Fraisse, Grenoble, both of France

[73] Assignee: SGS-Thomson Microelectronics S.A., Saint Genis, France

[21] Appl. No.: 09/073,495

[22] Filed: May 6, 1998

[30] Foreign Application Priority Data

May 7, 1997 [FR] France .................................. 97 05867

[51] Int. Cl.⁷ ...................................................... H03M 3/00
[52] U.S. Cl. ...................................................... 341/143
[58] Field of Search ................................. 341/143, 144, 341/155, 110

[56] References Cited

U.S. PATENT DOCUMENTS 3,666,889  5/1972  Zegers et al. .......................... 179/15
5,610,606  3/1997  Fukunaga et al. ...................... 341/143
5,936,562  8/1999  Brooks et al. .......................... 341/143
5,940,019  8/1999  Majeima ................................ 341/143

FOREIGN PATENT DOCUMENTS 15 12 474  5/1969  Germany .

*Primary Examiner*—Brian Young
*Attorney, Agent, or Firm*—Wolf, Greenfiled & Sacks, P.C.; James H. Morris; Theodore E. Galanthay

[57] ABSTRACT

The present invention relates to a method and a device of information transfer between two circuits exchanging data via delta-sigma converters. The present invention includes coding the information in the form of at least one signal of determined frequency corresponding to an integer multiple of a frequency of the digital data samples; mixing, at a first end of a line carrying an oversampled digital signal of the converter, the signal of determined frequency; extracting from the mixture, at a second end of the line, the signal of determined frequency; and decoding the corresponding information.

11 Claims, 2 Drawing Sheets

METHOD AND DEVICE OF INFORMATION TRANSFER BETWEEN CIRCUITS THAT EXCHANGE DATA VIA CONVERTERS

BACKGROUND OF THE INVENTION

1. Field of the Invention

The present invention relates to the field of digital-to-analog and analog-to-digital converters. The present invention more specifically relates to so-called "delta-sigma" converters which perform a coding/decoding of the digital signals at a much higher frequency than the sampling frequency, and which use actual digital-to-analog and analog-to-digital converters on a single bit.

The present invention more specifically relates to exchanges of information, other than the data processed by the converters, between circuits communicating via delta-sigma converters.

2. Discussion of the Related Art

Delta-sigma converters are used, for example, in modems that transmit data over a telephone line. In such an application, an analog part of the circuit connected to the telephone line must be galvanically isolated from digital inputs/outputs of the modem connected, for example, to a digital signal processor or to a microcomputer. Signals other than the actual data must generally transit through the galvanic isolation barrier of the modem. These additional signals require additional isolation means, separated from the isolation means through which the data transit, which is prejudicial to the cost and bulk of the modem.

Delta-sigma converters are also used in other applications, for example, between a digital circuit for processing audio data and an analog circuit that restores or records an audio signal. In such applications, it is frequent that information other than the actual audio data have to be transferred between the digital and analog parts of the system. The transfer of such additional information conventionally requires additional links dedicated to this information.

SUMMARY OF THE INVENTION

The present invention aims at providing a novel method of information transfer between two circuits exchanging data via a digital-to-analog or analog-to-digital converter of delta-sigma type without it being necessary to provide additional links dedicated to this information.

A first solution includes putting aside, on the digital side, a certain number of bits for this additional information. However, in addition to the fact that such a solution increases the number of bits, it is not satisfactory since it transfers information from the digital circuit to the analog circuit only. Further, such information then pollutes the actual data analog signal.

An object of the present invention is to provide a method of information transfer which, while enabling the use of a link by the converter, does not pollute the transfer of actual data.

The present invention also aims at not modifying the number of bits over which the converter operates.

To achieve these and other objects, the present invention provides a method of information transfer between two circuits exchanging data via delta-sigma converters, including the steps of: coding the information in the form of at least one signal of determined frequency corresponding to an integer multiple of a frequency of digital data samples; mixing, at a first end of a line carrying an oversampled digital signal of the converter, the signal of determined frequency; extracting from the mixture, at a second end of the line, the signal of determined frequency; and decoding the corresponding information.

According to an embodiment of the present invention, several additional information signals are transferred by being each associated with a determined frequency corresponding to an integer multiple of the frequency of the digital data samples.

According to an embodiment of the present invention, the oversampling frequency of the delta-sigma converter is chosen to be much higher than the frequency of the digital samples.

According to an embodiment of the present invention, applied to a digital-to-analog converter, said line connects a noise shaping circuit to a converter over one bit of the digital oversamples, the signal of determined frequency being mixed to the digital data samples upstream of the noise shaping circuit.

According to an embodiment of the present invention, applied to a digital-to-analog converter, said line connects a modulator issuing oversamples over one bit to a digital decimator, the signal of determined frequency being mixed to a digital data analog signal upstream of the modulator.

According to an embodiment of the present invention, the digital data are audio data.

According to an embodiment of the present invention, said line crosses a galvanic isolation barrier separating digital and analog parts of the converter.

The present invention also relates to an information transfer device over a line of oversampled digital data of a digital-to-analog delta-sigma converter, which includes: means for coding at least one information signal in the form of a signal of determined frequency corresponding to an integer multiple of a sampling frequency of the digital data input in the converter; means for mixing, at a first end of the line, the signal of determined frequency with the oversampled digital data signal issued by a circuit for shaping the converter noise; and means for extracting, at a second end of the line, the signal of determined frequency from the mixed signal.

The present invention also relates to an information transfer device over a line of oversampled digital data of an analog-to-digital delta-sigma converter, which includes: means for coding at least one information signal in the form of a signal of determined frequency corresponding to an integer multiple of a sampling frequency of the digital data restored by the converter; means for mixing, at a first end of the line, the signal of determined frequency with an oversampled digital data signal issued by a modulator receiving an analog data signal; and means for extracting, at a second end of the line, the signal of determined frequency from the mixed signal.

According to an embodiment of the present invention, the device further includes means for multiplexing several signals of determined frequencies before the mixing means, and means for demultiplexing these signals of determined frequency at the second end of the line.

The foregoing objects, features and advantages of the present invention will be discussed in detail in the following non-limiting description of specific embodiments in connection with accompanying drawings.

DETAILED DESCRIPTION

Figure 1:
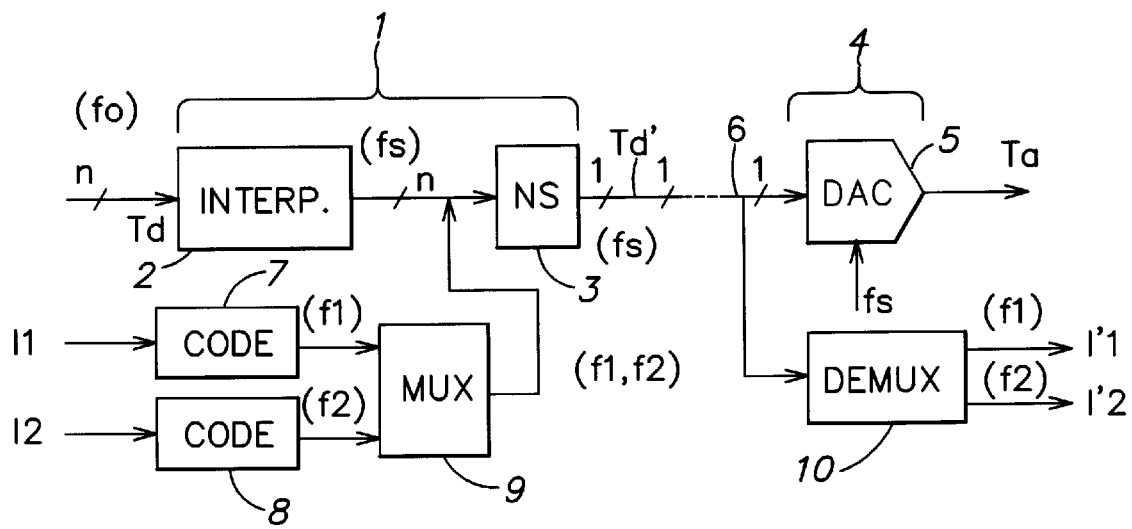
FIG. 1 shows, in the form of a block diagram, a delta-sigma digital-to-analog converter associated with an information transfer device according to the present invention.

For clarity, only those elements of the delta-sigma converters which are necessary to the understanding of the present invention have been shown in the drawings and will be described hereafter.

FIG. 1 shows an embodiment of a delta-sigma digital-to-analog converter associated with an information transfer device according to the present invention.

A delta-sigma converter includes a digital part 1 of filtering and formatting of data words Td over n bits into a digital signal Td' over a single bit. Signal Td transits through an interpolation filter 2 (INTERP) which forms a finite impulse response filter exhibiting zeros for each multiple of frequency f0 of the samples of signal Td. Filter 2 is generally preceded by a half-band filter (assumed to be included in block 2) which issues the samples at a frequency p.f0 to the interpolation filter, p representing an integer which is higher than or equal to 2. Filter 2 issues digital oversamples at a frequency fs=p.q.f0, where q represents an integer number. Product p.q is generally higher than or equal to 64. The n outputs of filter 2 are sent onto a noise shaping circuit 3 (NS), the function of which is to push back the quantization noise outside the useful band. Circuit 3 issues signal Td' over a single bit at oversampling frequency fs. Signal Td' is sent onto an analog part 4 of the converter, essentially formed of a one bit digital-to-analog converter (DAC) 5 working at oversampling frequency fs and issuing an analog signal Ta. The level of a current sample is determined by incrementing, or decrementing, the level of the preceding sample according to the state of the single bit. Converter 5 performs, at its output, a low-pass filtering to eliminate the quantization noise previously pushed back outside the useful band.

Figure 2:
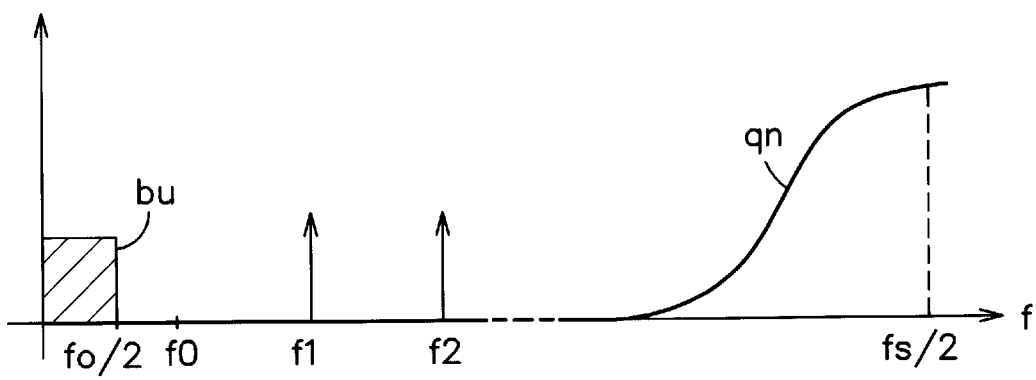
FIG. 2 illustrates the spectral distribution of the data and information transfer in a device such as shown in FIG. 1.

FIG. 2 illustrates the operation of such a converter from a frequency point of view. Useful band bu contains the frequencies lower than data sampling frequency f0/2 and quantization noise qn has a gaussian spectral density centered on frequency fs/2. Frequency fs generally corresponds to a very high multiple of frequency f0. For example, in audio applications, frequency fs is approximately 64 or 128 times frequency f0. For a data transmission by means of a modem, frequency fs corresponds to a multiple generally included between 96 and 256 of frequency f0.

The structure and operation of a delta-sigma digital-to-analog converter is well known and will not be discussed in more detail.

According to the present invention, line 6 separating circuit 3 from converter 5 is used to transmit additional information with respect to the data. This transmission is performed at one or several frequencies f1, f2, lower than frequency fs and corresponding to integer multiples of frequency f0. In the example shown, two information signals I1 and I2 are transmitted at frequencies f1 and f2 corresponding, for example, to two or three times frequency f0. Information signals I1 and I2 are, for example, formed of binary signals over one bit which pass through encoders (CODE) 7, 8, transforming these binary signals into frequency signals at frequency f1. The respective outputs of encoders 7 and 8 are mixed by a multiplexer 9 (MUX). The output of multiplexer 9 is mixed with the data signal, at a first end of line 6. In practice and as illustrated in FIG. 1, the mixture of the output of multiplexer 9 with the digital data is performed, preferably, upstream of noise shaping circuit 3. It is indeed not very handy to mix frequency signals with a digital signal over 1 bit. The number of bits over which frequencies f1 and f2 are mixed depends on the desired amplitude for these frequencies. At the other end of line 6 (on the side of converter 5), the mixed signal is sent, on the one hand, to the input of converter 5 and, on the other hand, to the input of a demultiplexer 10 for detecting the presence of frequencies f1 and f2 and separating them to restore the two information signals I'1 and I'2 at frequencies f1 and f2.

As illustrated in FIG. 2, frequencies f1 and f2 do not pollute the data going through the deltasigma converter. Indeed, these frequencies are located between the useful band and the quantization noise distribution around frequency fs/2.

Figure 3:
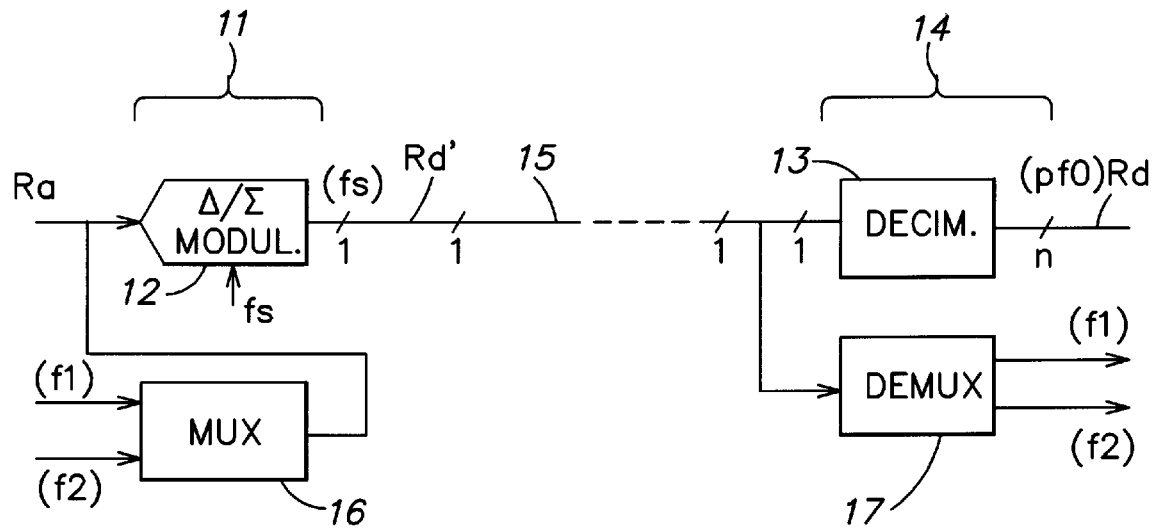
FIG. 3 shows, the form of a block diagram, a delta-sigma analog-to-digital converter associated with an information transfer device according to the present invention.

FIG. 3 shows an embodiment of an analog-to-digital delta-sigma converter associated with a device that transfers additional information according to the present invention.

An analog-to-digital delta-sigma converter generally includes an analog part 11 formed of a modulator 12 (Δ/Σ MODUL) at an oversampling frequency fs, receiving an analog signal Ra. Modulator 12 issues digital oversamples Rd' over one bit at frequency fs. Signal Rd' is sent onto a digital decimator 13 (DECIM) of a digital part 14 of the converter. The function of decimator 13 is to convert the oversamples over 1 bit into n samples Rd at frequency p.f0 (fs/q). Decimator 13 forms a finite impulse response filter comprising zeros for each multiple of frequency f0 and performs a low-pass filtering of signal Rd'. The outputs of decimator 13 generally transit through a half-band filter (assumed to be included in block 13) which brings back the n samples to frequency f0 and issues signals Rd over n bits.

Figure 4:
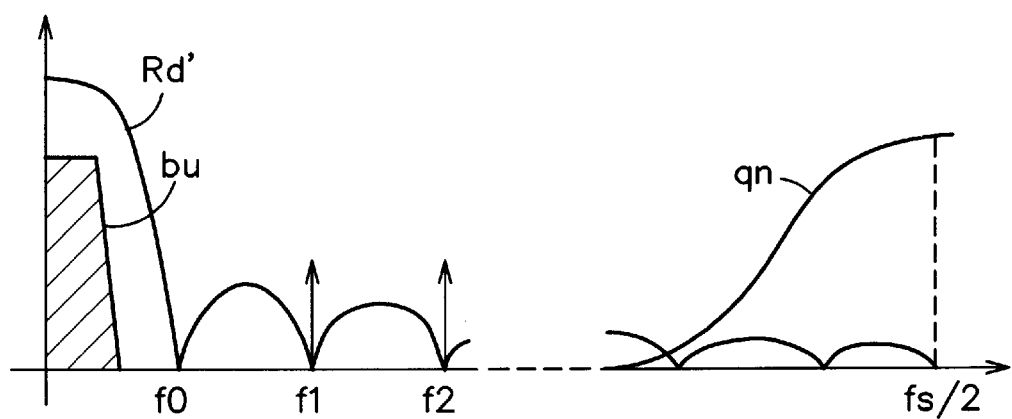
FIG. 4 illustrates the spectral distribution of the data and information transfer in a device such as shown in FIG. 3.

FIG. 4 illustrates the frequency response of an analog-to-digital delta-sigma converter. The quantization noise qn is, as previously, of gaussian form and is centered on frequency fs/2. The frequency response of modulator 12 exhibits zeros for each multiple of frequency f0. Decimator 13 eliminates any frequency higher than the useful band bu of the converted signal.

As for the digital-to-analog converter, the structure and operation of an analog-to-digital delta-sigma converter is well known and will not be discussed in further detail.

According to the present invention, to transmit additional information over line 15 separating modulator 12 from decimator 13, one or several frequencies corresponding to integer multiples of frequency f0 are used, as in the case of the digital-to-analog conversion. If several additional information signals have to be transmitted, these information signals are, as previously, multiplexed (MUX 16), and are here mixed with signal Rd'. The mixture is, preferably, performed upstream of modulator 12, that is, on signal Ra. At the other end of line 15, the signal is sent on the one hand to decimator 13, and on the other hand to a demultiplexer 17 (DEMUX) for detecting and isolating frequencies f1 and f2 to restore the transmitted information. Of course, as in the case of the digital-to-analog conversion, the additional information may be coded upstream of multiplexer 16 and decoded downstream of demultiplexer 17.

As can be seen in FIG. 4, the transfer of the additional information at frequencies f1 and f2 does not pollute the data since these frequencies f1 and f2 are filtered before restoration of data Rd. Indeed, these frequencies correspond to zeros of finite impulse response filter 3 and are included between the useful band of the converter and the quantization noise distribution around frequency fs/2.

If, for reasons of practical implementation convenience, the fixed frequency signals are, for a transfer using the digital-to-analog converter, generated in the form of digital frequencies to be mixed with the actual data and, for a transfer using the analog-to-digital converter, generated in the form of analog signals to be mixed with the analog data signal, these signals can also be mixed with the oversampled digital signals over 1 bit, that is, at the output of circuit 3 (FIG. 1) or at the output of circuit 12 (FIG. 2).

The number of additional information signals that it is possible to transmit by implementing the present invention depends on the ratio between oversampling frequency fs and frequency f0. Thus, delta-sigma converters having a much higher oversampling frequency than frequency f0 will preferably be used. This condition is perfectly compatible with the usual ratios between frequencies fs and f0 in audio applications or applications of digital data transmission by means of a modem.

To implement the present invention in a modem of digital data transmission between a user's equipment, for example, a microcomputer, and a telephone line, the galvanic isolation between the telephone line and the user's equipment is, according to the present invention, performed between the digital (1, 14) and analog (4, 11) parts of the delta-sigma converters. Thus, additional information such as control signals and signals for programming the analog part can transit through the same isolation barrier as the data without requiring additional isolation means.

In a system for restoring or recording sound signals coded in digital form, the implementation of the present invention superposes on the same line (6, 15) both the audio data and the control signals (for example, a volume control for the analog sound restoration part).

An advantage of the present invention is that it reduces or minimizes the number of connections needed to transmit information between circuits exchanging data by means of delta-sigma converters.

Of course, the present invention is likely to have various alterations, modifications, and improvements which will readily occur to those skilled in the art. In particular, the practical implementation of the coding of the information signals to be transmitted and of the possible multiplexers and demultiplexers is within the abilities of those skilled in the art according to the functional indications given hereabove. Further, the number and the choice of the frequencies of transmission of the additional information depend on the application for which the device of the present invention is meant, provided that these frequencies always correspond to integer multiples of the data sampling frequency. Further, the present invention applies to any system of conversion respecting the features of 1 bit delta-sigma converters, that is, exhibiting a transfer line of data oversampled over 1 bit.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of information transfer between two circuits exchanging data via delta-sigma converters, the method comprising the steps of:

coding the information in the form of at least one signal of determined frequency corresponding to an integer multiple of a frequency of digital data samples;

mixing, at a first end of a line carrying an oversampled digital signal of the converter, said signal of determined frequency;

extracting from the mixture, at a second end of the line, said signal of determined frequency; and decoding the corresponding information.

2. The method of claim 1, wherein several additional information signals are transferred, each being associated with a determined frequency corresponding to an integer multiple of the frequency of the digital data samples.

3. The method of claim 1, wherein the oversampling frequency of the delta-sigma converter is chosen to be much higher than the frequency of the digital samples.

4. The method of claim 2, applied to a digital-to-analog converter, wherein said line connects a noise shaping circuit to a converter over one bit of the digital oversamples, the signal of determined frequency being mixed to the digital data samples upstream of the noise shaping circuit.

5. The method of claim 2, applied to a digital-to-analog converter, wherein said line connects a modulator issuing oversamples over one bit to a digital decimator, the signal of determined frequency being mixed to a digital data analog signal upstream of the modulator.

6. The method of claim 1, wherein the digital data are audio data.

7. The method of claim 1, wherein said line crosses a galvanic isolation barrier separating digital and analog parts of the converter.

8. An information transfer device over a line of oversampled digital data of a digital-to-analog delta-sigma converter, including:

means for coding at least one information signal in the form of a signal of determined frequency corresponding to an integer multiple of a sampling frequency of the digital data input into the converter;

means for mixing, at a first end of the line, the signal of determined frequency with the oversampled digital data signal issued by a circuit for shaping the converter noise; and means for extracting, at a second end of the line, the signal of determined frequency from the mixed signal.

9. The device of claim 8, further including means for multiplexing several signals of determined frequencies before the mixing means, and means for demultiplexing these signals of determined frequency at the second end of the line.

10. An information transfer device over a line of over sampled digital data of an analog-to-digital delta-sigma converter, including:

means for coding at least one information signal in the form of a signal of determined frequency corresponding to an integer multiple of a sampling frequency of the digital data restored by the converter;

means for mixing, at a first end of the line, the signal of determined frequency with an oversampled digital data signal issued by a modulator receiving an analog data signal; and means for extracting, at a second end of the line, the signal of determined frequency from the mixed signal.

11. The device of claim 10, further including means for multiplexing several signals of determined frequencies before the mixing means, and means for demultiplexing these signals of determined frequency at the second end of the line.

* * * * *